US010462964B2

(12) United States Patent
Eubanks

(10) Patent No.: US 10,462,964 B2
(45) Date of Patent: Nov. 5, 2019

(54) REAR MOUNTED ROTATING MOWER ASSEMBLY

(71) Applicant: DEERE & COMPANY, Moline, IL (US)

(72) Inventor: Jason C Eubanks, Hedrick, IA (US)

(73) Assignee: DEERE & COMPANY, Moline, IL (US)

( * ) Notice: Subject to any disclaimer, the term of this patent is extended or adjusted under 35 U.S.C. 154(b) by 862 days.

(21) Appl. No.: 14/855,709

(22) Filed: Sep. 16, 2015

(65) Prior Publication Data
US 2017/0071126 A1  Mar. 16, 2017

(51) Int. Cl.
*A01D 34/78* (2006.01)
*A01D 34/76* (2006.01)
*A01D 34/86* (2006.01)

(52) U.S. Cl.
CPC ............ *A01D 34/78* (2013.01); *A01D 34/76* (2013.01); *A01D 34/866* (2013.01)

(58) Field of Classification Search
CPC ........ A01D 34/86; A01D 34/81; A01D 34/78; A01D 34/66; A01D 34/866; A01D 34/76; A01D 34/661
See application file for complete search history.

(56) References Cited

U.S. PATENT DOCUMENTS 2,309,635 A * 2/1943 Edwards ................ A01D 34/86
  56/15.3
3,152,431 A * 10/1964 Beaman, Jr. ......... A01D 34/412
  56/13.6
3,857,225 A    12/1974 Knudson
4,196,917 A    4/1980 Oakes et al.
4,345,420 A * 8/1982 Oosterling ............ A01D 34/66
  56/192
4,887,417 A   12/1989 Parsons, Jr.
(Continued)

FOREIGN PATENT DOCUMENTS

DE    1482839 B    9/1969
DE    8907678 U1   10/1990

OTHER PUBLICATIONS

European Patent Office, European Search Report, and the European Search Opinion, dated Jan. 11, 2017, 9 pages.
(Continued)

*Primary Examiner* — Thomas B Will
*Assistant Examiner* — Joan D Misa
(74) *Attorney, Agent, or Firm* — Taft Stettinius & Hollister LLP; Stephen F. Rost

(57) ABSTRACT

A mounted mower coupled to a hitch of a work machine that has an output, the mounted mower comprising a sub-frame having one or more hitch couplers selectively coupled to the hitch of the work machine. The mounted mower also has a mower arm with a first end and a second end, the first end being pivotally coupled to the sub-frame. The mower arm is pivotable about the first end between a first position and a second position relative to the sub-frame. The mower arm has a mower head mechanically coupled to the mower arm at the second end. The mower head has at least one disc pivotally coupled to the mower head, the at least one disc able to rotate about a disc pivot axis defined by the respective disc. Further, at least one disc may change the direction the disc rotates between the first and second position.

6 Claims, 6 Drawing Sheets

(56) References Cited

U.S. PATENT DOCUMENTS

| | | | |
|---|---|---|---|
| 5,199,249 A * | 4/1993 | Wattron | A01B 73/005 56/15.2 |
| 5,287,682 A * | 2/1994 | Rautenbach | A01D 34/76 56/13.6 |
| 5,423,165 A * | 6/1995 | Walch | A01B 73/005 56/15.2 |
| 5,430,997 A | 7/1995 | O'Halloran et al. | |
| 5,566,537 A * | 10/1996 | Kieffer | A01D 34/661 56/15.2 |
| 5,722,222 A | 3/1998 | Walters et al. | |
| 5,901,537 A * | 5/1999 | Walch | A01D 34/661 56/15.2 |
| 6,421,994 B1 | 7/2002 | Boucher et al. | |
| 6,532,723 B2 | 3/2003 | Delmas et al. | |
| 7,047,714 B1 | 5/2006 | Stephenson et al. | |
| 7,207,166 B2 | 4/2007 | Stephenson | |
| 7,306,252 B2 * | 12/2007 | Barnett | A01B 59/042 172/449 |
| 8,256,198 B2 | 9/2012 | Thompson | |
| 2003/0024228 A1 | 2/2003 | Franet | |
| 2004/0148917 A1 | 8/2004 | Eastwood | |
| 2004/0221558 A1 | 11/2004 | Stevenson et al. | |

OTHER PUBLICATIONS

Kuhn GMD 3510; http://www.kuhnnorthamerica.com/us/hay-and-forage-tools-mowers.html&p=26.7.1.5.1 (last viewed Oct. 2, 2015); 1 page.

* cited by examiner

REAR MOUNTED ROTATING MOWER ASSEMBLY

FIELD OF THE DISCLOSURE

The present disclosure relates to a tractor or other work machine with a rear mount hitch, and in particular, to a mower assembly that can be mounted to the rear mount hitch.

BACKGROUND OF THE DISCLOSURE

Work machines of many different types have rear mount hitch assemblies that provide a coupling location for a plurality of different implements or attachments. In addition to providing one or more coupling points, it is common for a rear mount hitch to provide an output for mechanical, electrical, or hydraulic power generated by an engine that also provides power to the work machine. Many implements or other attachments couple to the work machine through the coupling points and also mechanically, electrically, or hydraulically couple to the output to provide power to the implement. In one such configuration, a mowing assembly is coupled to the work machine.

There are many different mowing assemblies that can be coupled to the rear mount hitch of the work machine. Mowing assemblies may extend directly away from the rear portion of the work machine and provide a cutting assembly that mows the underlying surface as the work machine travels there along. Mowing assemblies have also been developed to extend away from a side of the work machine to allow a user to cut down any debris that may be along the side of the work machine as it travels along the underlying surface. In certain mowing assembly configurations, a hydraulic assembly pivots or otherwise transfers the mower assembly between a stow position and a cut position. Further still, some mower assemblies have multiple positions that allow the user to select how the mower assembly should be positioned prior to powering the mower assembly.

Some mowers utilize a plurality of rotating discs with knives coupled thereto. The discs rotate in specific rotational directions, often in alternating rotational directions, to cut the underlying debris and to position the cut debris in a desired location. In this configuration, the discs are specifically designed to rotate in a particular direction as the work machine travels along the underlying surface. Further, the location of the mower assembly is limited by the direction the discs are spinning as well as by the method of coupling the mower assembly to the output of the work machine.

SUMMARY

In one embodiment, a mounted mower is adapted to be coupled to a hitch of a work machine that has an output, the mounted mower may have a sub-frame having one or more hitch couplers adapted to be selectively coupled to the hitch of the work machine. The mounted mower may have a mower arm having a first end and a second end, the first end may be pivotally coupled to the sub-frame, the mower arm may be pivotable about the first end between a first position and a second position relative to the sub-frame. The mounted mower may include a mower head mechanically coupled to the mower arm at the second end and at least one disc pivotally coupled to the mower head, the at least one disc may rotate about a disc pivot axis defined by the respective disc. In one embodiment, when the mower arm is in the first position the at least one disc rotates about the disc pivot axis in a first rotation pattern, and when the mower arm is in the second position the at least one disc rotates about the disc pivot axis in a second rotation pattern, the first rotation pattern and the second rotation pattern being different rotation patterns.

In one embodiment, the mower arm is pivotable to a third position that is between the first position and the second position and in the third position the at least one disc may not rotate. Further, an electric motor may be mechanically coupled to the at least one disc, the electric motor selectively rotating the at least one disc in either the first rotation pattern or the second rotation pattern. The electric motor may also operably reduce the rotational speed of the at least one disc as the mower arm pivots from the first position to the third position and operably increases the rotational speed of the at least one disc as the mower arm pivots from the third position to the second position.

In another embodiment, the mounted mower may have a hydraulic pump coupled to the sub-frame. The hydraulic pump may further be coupled to a hydraulic motor and the hydraulic pump may be mechanically coupled to the output of the work machine to provide hydraulic fluid to the hydraulic motor. Further, the hydraulic motor may be mechanically coupled to the at least one disc and selectively rotate the at least one disc in the first rotation pattern when the mower arm is in the first position, and selectively rotate the at least one disc in the second rotation pattern when the mower arm is in the second position.

In one embodiment, the mounted mower may have a gear assembly and a clutch coupled to the sub-frame. The gear assembly may have an input adapted to be mechanically coupled to the output of the work machine and an output drive mechanically coupled to the at least one disc, wherein the gear assembly may selectively rotate the at least one disc. The gear assembly and clutch may selectively rotate the at least one disc in the first rotation pattern when the mower arm is in the first position and in the second rotation pattern when the mower arm is in the second position.

In yet another embodiment, a mower assembly may be coupled to a hitch of a work machine that has an output. The mower assembly may have a sub-frame with one or more coupling points, the sub-frame may be coupled to the hitch of the work machine via the coupling points. The mounted mower may also have a drive assembly coupled to the sub-frame, the drive assembly may have an input coupler and a drive assembly output, the input coupler may be driven by the output of the work machine. A mower arm may be pivotally coupled to the sub-frame at a primary pivot and a rotation member may have a first end pivotally coupled to the mower arm and a second end pivotally coupled to the sub-frame, the rotation member may also be pivotable to change the angular orientation of the mower arm relative to the sub-frame. A mower head may be coupled to the mower arm, the mower head may also have a cutterbar assembly with a plurality of discs. A drive line may couple the drive assembly output to the cutterbar assembly, the drive line may also selectively rotate the plurality of discs. Further, the mower arm may rotate the mower head about the primary pivot greater than 90 degrees from a first side of the work machine to a second side of the work machine. Further, when the mower head is on the first side of the work machine the plurality of discs may rotate in a first rotation pattern. The first rotation pattern may have at least one different rotation direction than a second rotation pattern.

In one embodiment, the drive assembly may have a gearset and at least one clutch, the gearset and clutch may be selectable to provide an output in a first output rotation and a second output rotation. Further, the drive line may have at least one drive chain mechanically coupling the output of the drive assembly to the cutterbar assembly via at least one sprocket. Each of the plurality of discs may be mechanically coupled respectively to a gear, each gear being may further be coupled to the adjacent gear and adapted to rotate in an opposite direction thereof, and the drive chain may mechanically couple to at least one of the gears. In one embodiment, each of the plurality of discs may be mechanically coupled to the drive chain through at least one disc chain and at least one disc sprocket.

In another embodiment, the mounted mower may have a drive gear mechanically coupled to the drive assembly output and a plurality of gears coupled to each of the plurality of discs. Each of the plurality of gears may engage the adjacent gear of the plurality of discs. The drive gear may selectively engage one of the plurality of gears for achieving the first rotation pattern, and selectively engage an adjacent gear for achieving the second rotation pattern. In one embodiment, the mounted mower may have at least one hydraulic motor fluidly coupled to a hydraulic pump and mechanically coupled to the cutterbar assembly, the hydraulic motor may operably rotate the plurality of discs. A brake may also be part of the mounted mower and selectively inhibit the rotation of the plurality of discs as the mower head pivots between the first side and the second side of the machine.

In yet another embodiment, the rotation device comprises a hydraulic cylinder having a first end and a second end, where the first end is pivotally coupled to the sub-frame and the second end is pivotally coupled to the mower arm. The second end of the hydraulic cylinder may be axially movable relative to the first end thereof. The mower arm may also be positionable relative to the sub-frame based on the axial movement between the first and second ends of the hydraulic cylinder.

In another embodiment, a mounted mower may be coupled to a hitch of a work machine that has an output and defines a driveline axis. The mounted mower may have a sub-frame adapted to be coupled to the hitch of the work machine and the sub-frame may define a first axis that is perpendicular to the driveline axis. A support arm may have a first end and a second end, the first end may be pivotally coupled to the sub-frame. A mower head may also be pivotally coupled to the second end of the support arm at a pivot point. The mower head may define a second axis and the pivot point may define a pivot axis. The support arm may pivot greater than 90 degrees about the sub-frame to position the mower head from a first side of the work machine to a second side of the work machine. The second axis may be perpendicular to the driveline axis both when the mower head is on the first side of the work machine and on the second side of the work machine. Further, at any position between the first side and the second side, the second axis may be perpendicular to the driveline axis. The first axis may remain substantially perpendicular to the driveline axis as the support arm is pivoted between the first side and the second side.

The mounted mower of the above embodiment may have a hydraulic mechanism pivotally coupling the support arm to the sub-frame. Further, the hydraulic mechanism may selectively position the mower head between the first side and the second side. In a different aspect of the above embodiment, a mechanical linkage may be coupled to the pivot point of the mower head and the mechanical linkage may align the second axis with the first axis when the mower head is at any position between the first side and the second side. In yet another aspect of the above embodiment, a drive mechanism may be coupled to the sub-frame and a cutting assembly may be coupled to the mower head. The drive mechanism may have an input mechanically coupled to the output of the work machine and the drive assembly may provide power to the cutting assembly.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
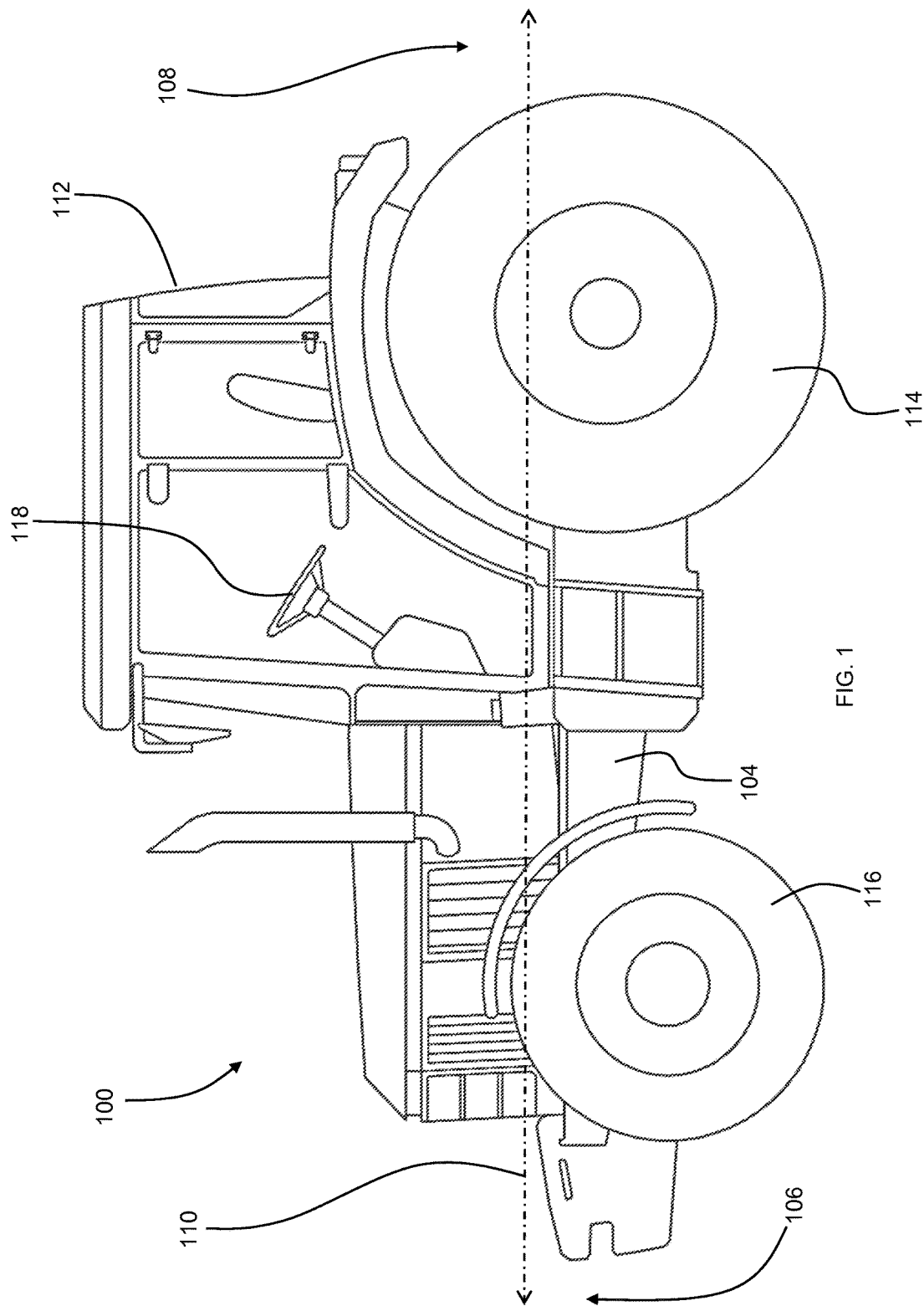
FIG. 1 is a side view of a conventional tractor.

Referring to FIG. 1, a conventional tractor 100 is shown having a front 106 and a rear 108 disposed along a drive line axis 110. The tractor 100 may have controls 118 located in a cab 112. Further, the tractor 100 may travel along an underlying surface via one or more rear wheel 114 and one or more front wheel 116.

While a conventional tractor is shown, this disclosure is not limited to such a machine. Rather, the teaching of this disclosure may be applicable to any machine of any type of vehicle, work machine, or tractor that has a hitch assembly. More specifically, it is common for vehicles of many types to have a hitch system adapted to be coupled to a towed assembly. In many configurations the hitch system of the tractor 100 may be a three-point hitch (not shown) spaced about the rear 108 of the tractor 100 and coupled to a chassis 104. In addition to having the three-point hitch, many tractors 100 may also have a power take-off ("PTO") assembly positioned along the rear 108 of the tractor 100 as well.

Many tractors 100 have a primary power source (such as an engine) that generates rotational power that is distributed to the various components of the tractor. In one non-limiting example, part of the rotational power generated by the power source is distributed to the PTO and may provide a location for a towed assembly to use a portion of the rotational power produced by the power source. A person having skill in the relevant art understands the many ways a tractor 100 or other work machine can provide power to a towed assembly and this disclosure is not limited to any one way.

Figure 2:
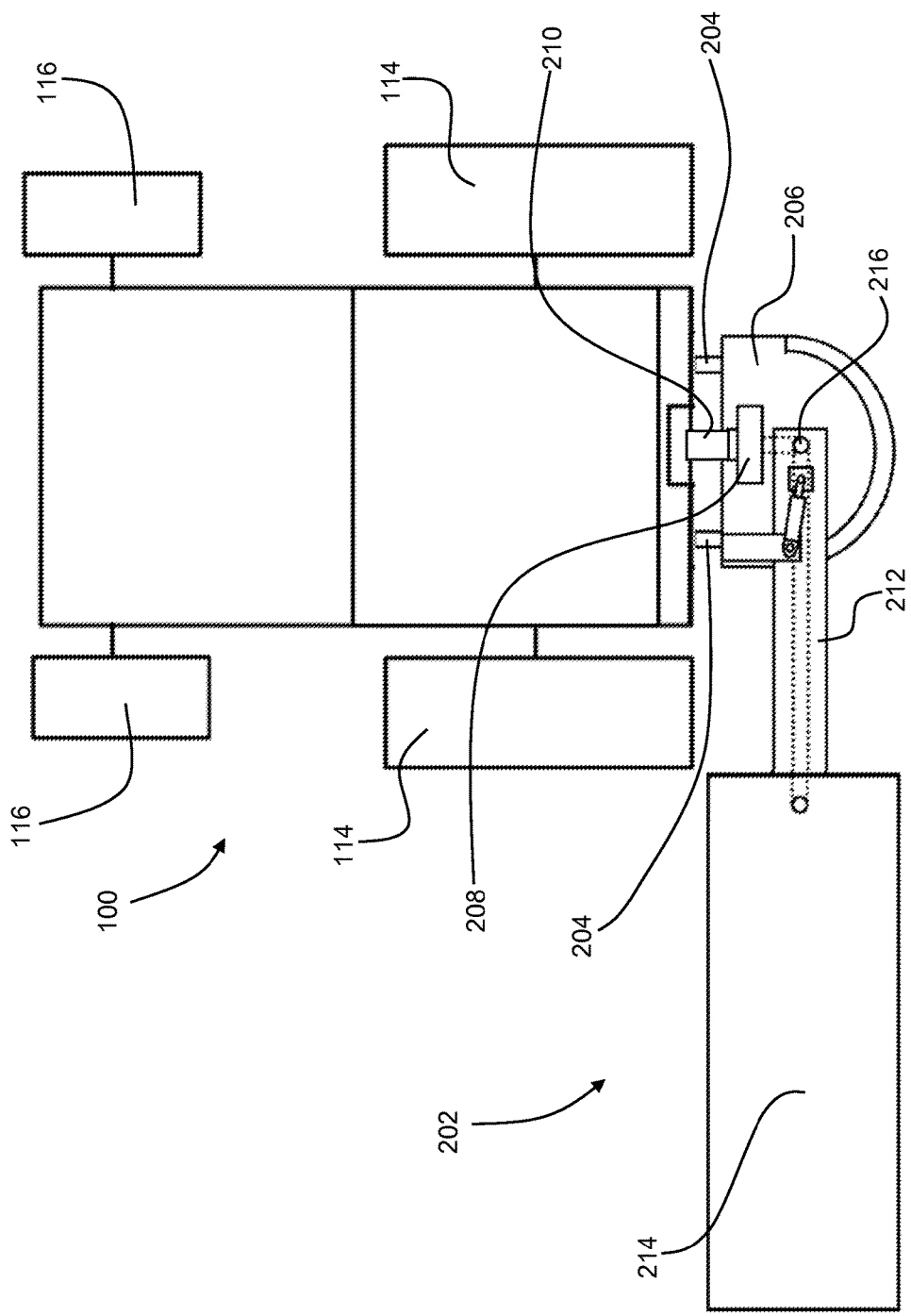
FIG. 2 is a top view of the work machine with a mower assembly coupled thereto.

Referring now to FIG. 2, a mower assembly 202 is shown mechanically coupled to tractor 100. More specifically, hitch couplers 204 may mechanically couple a sub-frame 206 of the mower assembly 202 to the tractor 100. The sub-frame 206 may be coupled to the tractor 100 via at least three couplers 204. However, in another embodiment, there may be fewer couplers 204. In one embodiment, there may be only one coupler. In the embodiment with three couplers 204, the three couplers 204 may be spaced from one another to allow the orientation of the sub-frame 206 to be substantially controlled by the position of the couplers 204 relative to the tractor 100. For example, in one non-limiting embodiment, one or more of the three couplers 204 may be coupled to a hydraulic cylinder (not shown) or other mechanism that can position the coupler(s) 204 at a plurality of different locations relative to one another. A person skilled in the art understands how a three-point hitch can control the orientation of an assembly that is coupled thereto and this disclosure is not limited to any particular hitch coupler configuration.

The sub-frame 206 may have at least one drive assembly 208 coupled thereto. The drive assembly 208 may be positioned along the sub-frame 206 to allow a shaft 210 to couple the PTO to the drive assembly 208. When the shaft 210 is coupled to the drive assembly 208, energy generated or stored by the power source of the tractor 100 may be distributed at least partially to the drive assembly 208.

The sub-frame 206 may also have a mower arm 212 coupled thereto. The mower arm 212 may be pivotally coupled to the sub-frame 206 at a proximal end with a pivot pin 216 and further coupled to a mower head 214 at a distal end. The mower arm 212 may pivot about the pivot pin 216 to a plurality of angular orientations relative to the sub-frame 206. In one non-exclusive embodiment, the mower arm 212 may pivot between about 90-180 degrees about the pivot pin 216. However, this disclosure should not be limited to any particular angular rotation.

The pivot pin 216 may utilize any number or type of bearings or slip surfaces to allow the mower arm 212 to pivot relative to the sub-frame 206. In one non-exclusive embodiment, a thrust bearing may be positioned between a bottom surface of the mower arm 212 and the sub-frame 206 so the mower arm 212 rotates substantially on the thrust bearing. In yet another embodiment, a low-friction material may be positioned along the portions of the sub-frame 206 and the mower arm 212 that contact one another to reduce friction as the mower arm 212 rotates relative to the sub-frame 206. In yet another embodiment, hardened steel or other similar material may be positioned along interface between the sub-frame 206 and the mower arm 212 and a lubricant such as grease or any other similar product can be positioned there between to facilitate rotation.

Figure 3:
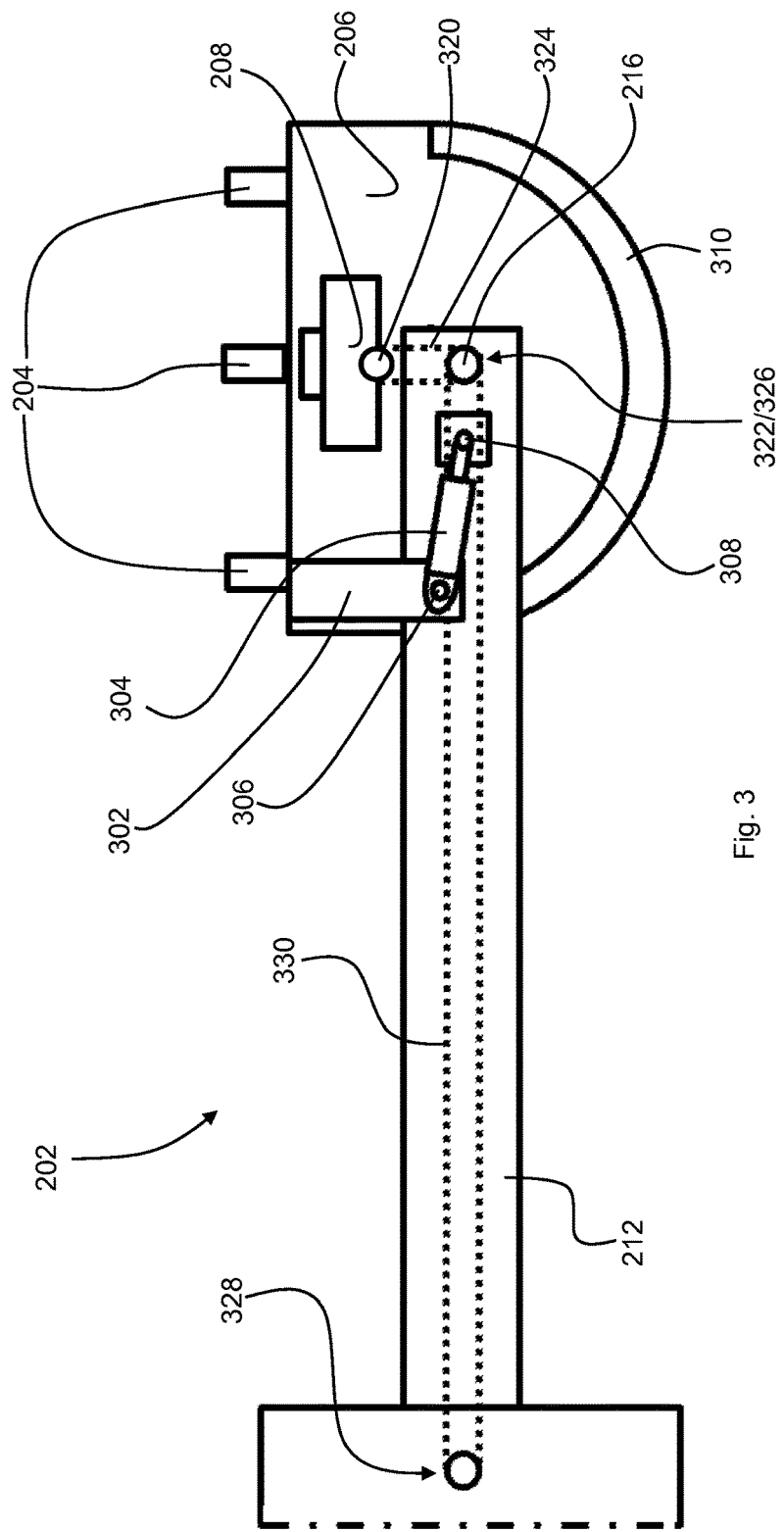
FIG. 3 is a partial top view of a sub-frame and a mower arm.

Referring now to FIG. 3, an isolated partial view of the mower assembly 202 is shown. In one embodiment, the sub-frame 206 may also have a rail 310 disposed along an arc-shaped path that is concentric with the pivot pin 216. The rail 310 may provide a guide for a roller (not shown) disposed on a bottom side of the mower arm 212. The roller may be positioned to roll along the rail 310 as the mower arm 212 pivots about the pivot pin 216.

While the rail 310 and roller have been described above, this disclosure is not limited to such a configuration. In one embodiment, the mower arm 212 may not have a roller at all. Rather, the rail may be made of a material that is low friction, such as Teflon or any other material that promotes movement between two bodies in contact with one another. In yet another embodiment, there may be no rail 310 at all.

In this embodiment, the mower arm 212 may have a roller that rolls along the sub-frame 206 but does not require a rail for guidance. In another embodiment, there may be no rail 310 or roller at all.

Also shown in FIG. 3 is a bracket 302 coupled to the sub-frame 206 at an outer edge of the sub-frame 206. The bracket 302 may be coupled to the sub-frame 206 utilizing a plurality of different coupling mechanisms such as welds, bolts, rivets, or any other coupling mechanism known in the art. Further, the bracket 302 may be pivotally coupled to a hydraulic cylinder or electric actuator 304 at a base end 306. The hydraulic cylinder or electric actuator 304 may also be pivotally coupled to the mower arm 212 at a far end 308 thereof. The hydraulic cylinder or electric actuator 304 may stroke longitudinally to change the distance between the base end 306 and the far end 308.

In one embodiment, a user may selectively alter the distance between the base end 306 and the far end 308 to change the angular position of the mower arm 212 relative to the sub-frame 206. In this embodiment, as the distance between the base end 306 and the far end 308 is reduced, the mower arm 212 may pivot about the pivot pin 216 in a clockwise manner when viewed from the perspective shown in FIG. 3. Further, when the distance between the base end 306 and the far end 308 is increased, the mower arm 212 may pivot about the pivot pin 216 in a counter clockwise manner when viewed from the perspective of FIG. 3.

While a hydraulic cylinder or electric actuator 304 has been described above this disclosure should not be limited to such a configuration. In another embodiment, an electric motor may be mechanically coupled to the mower arm 212 through gears or sprockets and chains or any other mechanical coupling means. Further, one or more brake or clutch may be utilized to mechanically couple the electric motor to the mower arm 212. The electric motor may provide a torsional force capable of rotating the mower arm 212 relative to the sub-frame 206. In another embodiment, a pneumatic system could be used. Further still, in one embodiment there may be no automated method of moving the mower arm 212. In this embodiment, the user may have to manually rotate the mower arm 212 to change its angular position relative to the sub-frame.

In any of the above embodiments, there may be a latching mechanism (not shown) that maintains the mower arm 212 in a particular orientation relative to the sub-frame 206. The latching mechanism may be a pin that is positioned through a portion of the mower arm 212 and into a portion of the sub-frame 206 to selectively restrict the mower arm 212 from moving relative to the sub-frame 206. In this embodiment the sub-frame 206 may have a plurality of holes that align with a corresponding hole in the mower arm 212. The mower arm 212 may be rotated about the pivot pin 216 by the hydraulic cylinder or electric actuator 304 or the like to a plurality of locations relative to the sub-frame 206. When the mower arm 212 is in a position desired by the user and aligned with one of the holes of the sub-frame 206, the user may place the pin therein to substantially restrict any further movement of the mower arm 212 relative to the sub-frame 206.

Figure 4:
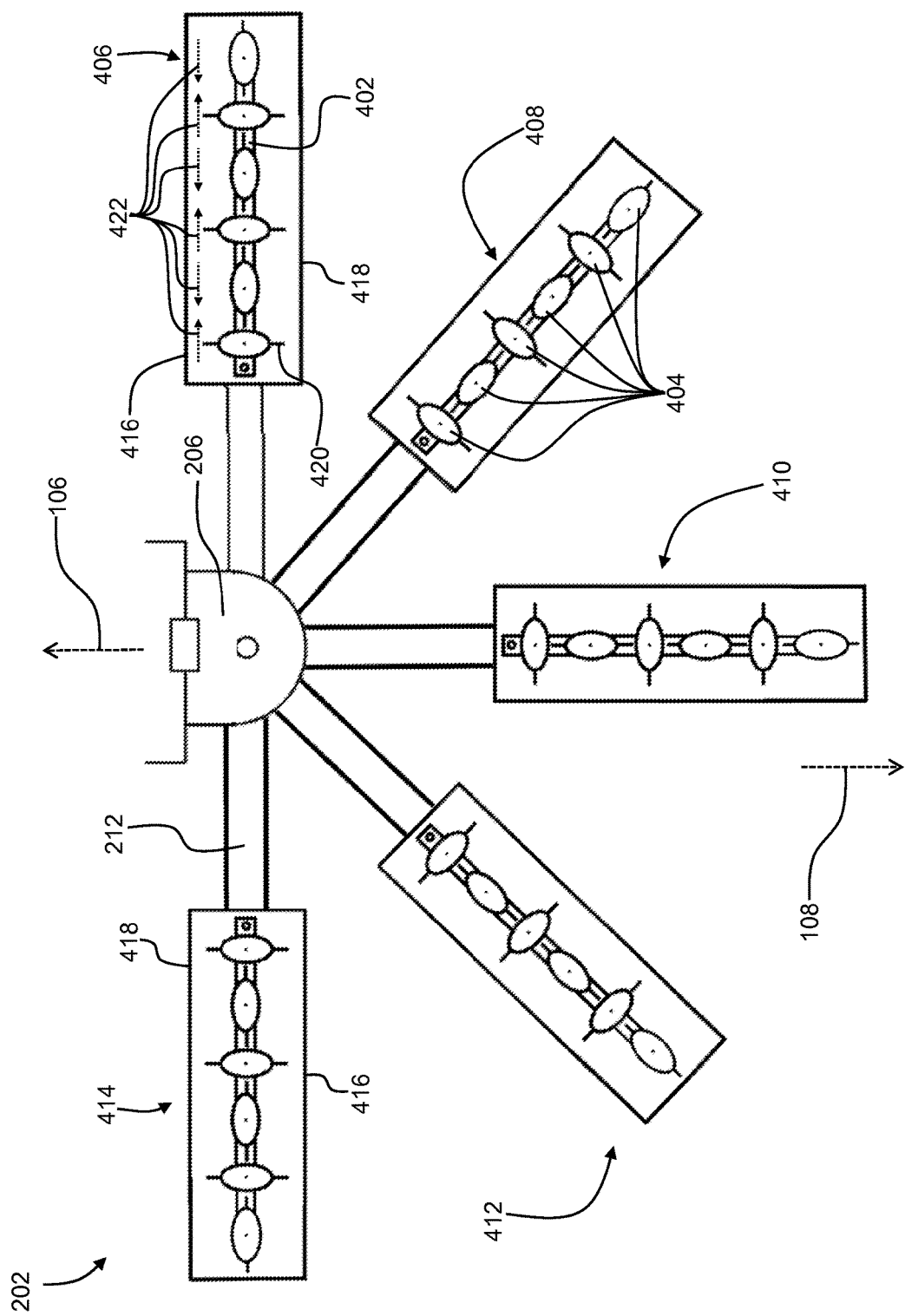
FIG. 4 is a partial bottom view of the work machine with representations of the mower assembly transitioning from a first position to a fifth position.

In another embodiment, the mower arm 212 may have a first and a second latch (not shown) each disposed on a different side of the mower arm 212. Each latch can be selectively coupled to one of a first and second receiver (not shown) of the sub-frame 206. The receivers may be positioned along the sub-frame 206 to allow the first latch to engage the first receiver when the mower arm 212 is in a first position 406 (FIG. 4) and the second latch to engage the second receiver when the mower arm 212 is in a fifth position 414 (FIG. 4).

In the aforementioned embodiment with the latches and receivers, the hydraulic cylinder or electric actuator 304 or the like may transition the mower arm 212 into the fifth position 414. As the mower arm 212 is transitioned into the fifth position 414, the first latch may contact, and become coupled to, the first receiver. Once the latch is coupled to the receiver, the mower arm 212 may be substantially locked in that particular position relative to the sub-frame 206. Further, the user may provide an input to one or more controls indicating a desire to position the mower arm 212 in the first position 406. The input may be transmitted to a controller that may send a signal to the first latch to release the first receiver and allow the hydraulic cylinder or electric actuator 304 or the like to begin rotating the mower arm 212 about the pivot pin 216. The mower arm 212 may then pivot to the first position 406 where the second latch may become coupled to the second receiver to thereby mechanically lock the mower arm 212 in the first position 406.

Referring back to the drive assembly 208, in one non-exclusive embodiment, the drive assembly 208 may utilize a planetary gearset and a plurality of clutches (not shown) to provide torque to an output 320 of the drive assembly 208. Further, the rotational direction of the output 320 may be reversed depending on the engagement of the clutches within the drive assembly 208. A person having skill in the relevant art understands that a planetary gearset can have a ring gear, a plurality of planetary gears coupled to a carrier, and a sun gear. In one non-exclusive embodiment, the PTO may be coupled to the ring gear and the output of the planetary gearset may be selectably coupled to either the carrier or the sun gear depending on the engagement of the clutches. Further, the rotational direction of the output 320 may differ depending on whether the output 320 is coupled to the carrier or the sun gear through the plurality of clutches. A person having skill in the art understands how the output of a planetary gear can be altered through a plurality of clutches and this disclosure is not limited to any one method.

The output 320 may be coupled to an output sprocket (not shown) that transfers the torsional force generated by the drive assembly 208 to a pivot sprocket 322 with a drive chain 324. In one embodiment, the pivot sprocket 322 may be concentric with, but rotationally independent from, the pivot pin 216. The pivot sprocket 322 may also be fixedly coupled to a first drive sprocket 326. In this embodiment, when the drive chain 324 causes the pivot sprocket 322 to rotate, the first drive sprocket 326 may rotate at the same rate. In this embodiment, the pivot sprocket 322 and the first drive sprocket 326 may be pivotally coupled to the pivot pin 216 through ball bearings or other similar pivotal coupling means. That is to say, the pivot sprocket 322 and the first drive sprocket 326 can rotate independent and separate from any rotation of the pivot pin 216.

The first drive sprocket 326 may be coupled to a second drive sprocket 328 with a mower chain 330. The second drive sprocket 328 may further be pivotally coupled to a drive gear 504 (FIG. 5) to provide torsional power to a plurality of discs 404 (FIG. 4).

In this embodiment, power is originally transferred to the PTO from the power source of the tractor 100. The PTO transfers a portion of that power through the shaft 210 in the form of a rotation and torque. The torque may be input into the drive assembly 208 by mechanically coupling the PTO to the ring gear of the planetary gearset. The plurality of clutches direct the torque within the drive assembly 208 either through the carrier or the sun gear of the planetary gearset and into the output 320. The output 320 may be coupled to the drive chain 324 to provide torque to the pivot sprocket 322. In turn, the pivot sprocket 322 may transfer the torque to the first drive sprocket 326 through their fixed coupling to one another. The first drive sprocket 326 may transfer the torque to the second drive sprocket 328 through the mower chain 330. Finally, the second drive sprocket 328 transfers the torque to the drive gear 504 to rotate the plurality of discs 404.

By positioning the pivot sprocket 322 and the first drive sprocket 326 along the pivot pin 216, the mower arm 212 can rotate about the pivot pin 216 as described above without affecting the tension of the mower chain 330 and/or the drive chain 324. More specifically, the pivot pin 216 remains the same distance from the output 320 regardless of the angular orientation of the mower arm 212 relative to the sub-frame 206. Similarly, the distance between the first drive sprocket 326 and the second drive sprocket 328 remains the same regardless of the angular orientation of the mower arm 212 relative to the sub-frame 206.

In another embodiment, instead of using chains 324, 330 and sprockets 322, 326, 328, belts and pulleys may be used. In yet another embodiment, drive shafts can be used instead of the chains 324, 330 and sprockets 322, 326, 328 based on the above teachings. Accordingly, this disclosure is not limited to any particular mechanical drive transfer method.

In another embodiment not specifically shown, the drive assembly 208 may be a hydraulic pump. In this embodiment, the PTO may provide torsional power to the hydraulic pump that is converted to fluid pressure/flow by the hydraulic pump. The hydraulic pump may be fluidly coupled with hydraulic hoses to a hydraulic motor that converts the fluid pressure/flow back to torsional power at the drive gear 504. Further, the hydraulic motor is adapted to rotate the discs 404. In this embodiment, the hydraulic hoses may be routed along the mower arm 212 at a location that allows the mower arm 212 to rotate about the pivot pin 216 without substantially interfering with the hydraulic hoses.

In a similar hydraulic embodiment, there may be no drive assembly 208 at all. Rather, hydraulic fluid pressure/flow may be generated by a hydraulic system already disposed on or in the tractor 100. In this embodiment, the hydraulic motor could be directly coupled to the hydraulic system instead of requiring the hydraulic pump of the drive assembly 208 to be powered by the PTO.

In the embodiments utilizing the hydraulic motor, the rotational direction of the hydraulic motor can be altered to change the rotation pattern of the discs 404. In this embodiment, one or more hydraulic valves may alter the flow of hydraulic fluid to power the hydraulic motor in either a first rotation pattern or a second rotation pattern depending on the orientation of the hydraulic valves.

In yet another embodiment, an electric motor (not shown) may by coupled to the drive gear 504 to provide a torsional force to rotate the discs 404. In this embodiment, there may not be a drive assembly 208. Rather, the electric motor may be electrically coupled to the tractor 100 to selectively provide torsional force to rotate the discs 404. The electric motor may also rotate in two different directions depending on the signal sent to the electric motor from the tractor 100. In another embodiment, the electric motor may be mechanically coupled to the discs through gears, sprockets and chains, or any other mechanical coupling means. Further, one or more brake or clutch assembly may be utilized to mechanically couple the electric motor to the discs.

Referring now to FIG. 4, a bottom view of the mower assembly 202 is shown in a first position 406, a second position 408, a third position 410, a fourth position 412, and a fifth position 414. While FIG. 4 appears to show more than one mower assembly 202 simultaneously coupled to the sub-frame 206, only one mower assembly 202 is coupled to the sub-frame 206 and each respective position is shown to illustrate potential configurations of the single mower assembly 202 as it is rotated between the first position 406 and the fifth position 414.

FIG. 4 more clearly illustrates how a cutterbar 402 and discs 404 are transitioned from the first position 406 to the fifth position 414. As described in more detail above, the mower head 214 can be coupled to the mower arm 212 that may be rotated about the pivot pin 216 to change angular disposition of the mower arm 212 relative to the sub-frame 206.

More specifically, the mower head 214 may have a first side 416 and a second side 418. When the mower assembly 202 is in the first position 406, the first side 416 may be facing the front direction 106 while the second side 418 may be facing the rear direction 108. However, when the mower assembly 202 is in the fifth position 414, the second side 418 is facing the front direction 106 and the first side 416 is facing the rear direction 108. That is to say, the mower head 214 may rotate substantially about 180 degree relative to the first position 406 as it rotates to the fifth position 414.

In one embodiment, the discs 404 may have at least one blade 420 coupled thereto along a radially outer portion of the respective disc 404. The blade may rotate as the disc 404 rotates and define a cutting portion (not specifically shown) that may engage underlying debris. The rotation pattern and speed of the discs 404 and the blades 420 is in part to generate a sufficient force to allow the blades 420 to sever portions of the underlying debris. The rotation pattern and speed of the discs 404 may also be utilized to position the underlying debris that has been severed to a desirable location.

To more clearly show the rotational relationship of the discs 404, rotation arrows 422 are shown illustrating the rotation pattern of the respective discs 404. As shown by the rotation arrows 422 of the first position, the disc 404 closest to the mower atm 212 rotates so the portion proximate to the first side 416 will push the severed debris away from the mower arm 212. The remaining discs 404 may alter rotational directions and the last disc 404 may rotate in a direction so the portion of the disc 404 towards the first side 416 is pushing the underlying debris towards the mower arm 212. In this embodiment, the portion towards the front 106 of both the first and last disc 404 may force underlying debris towards the remaining discs 404. This particular rotational pattern may provide for consistent performance of the mower head 214 and limit the amount of debris ejected from the mower head 214 by the rotating discs 404.

Figure 5:
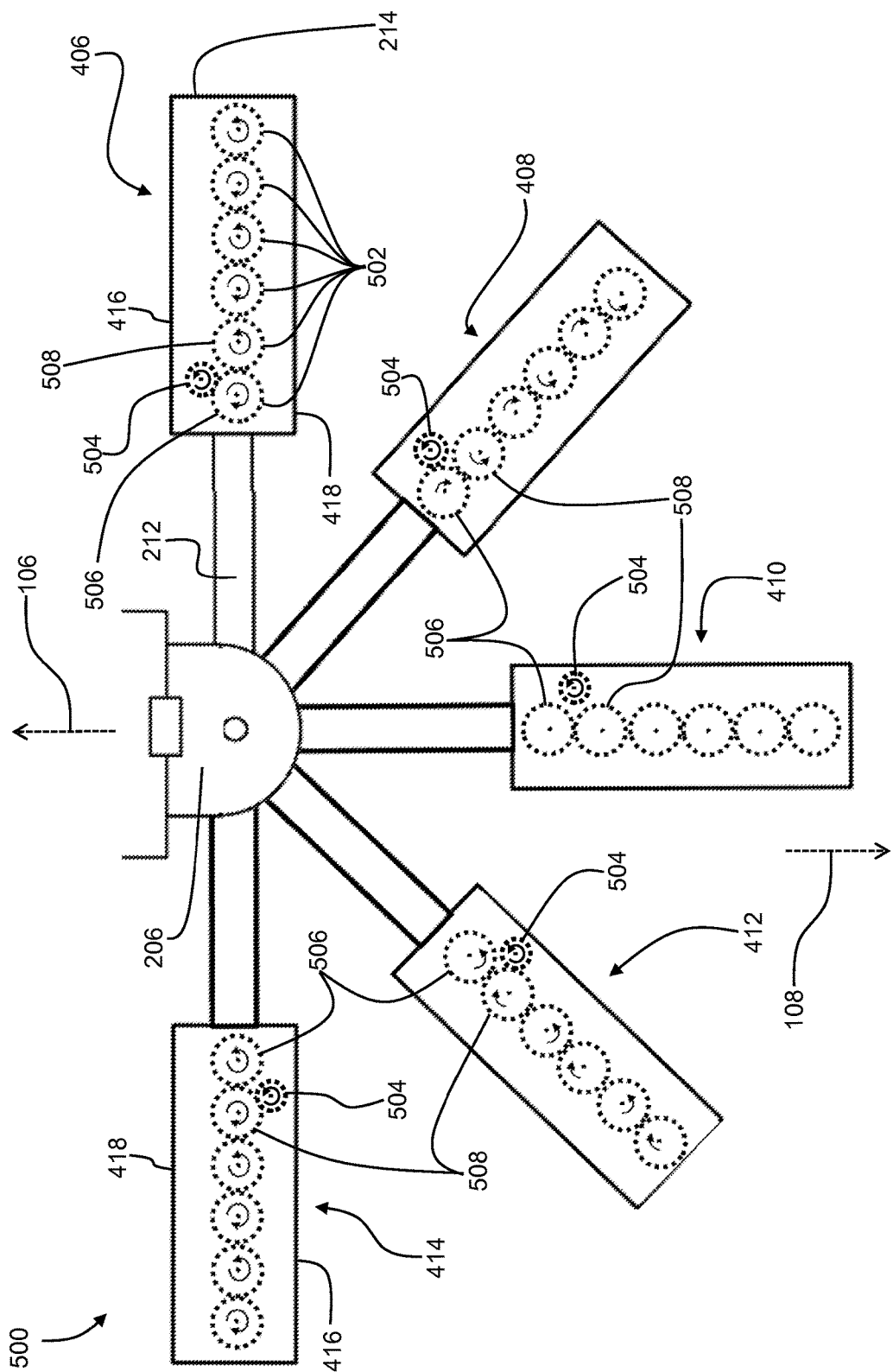
FIG. 5 is a partial bottom view of FIG. 4 with a disc drive assembly shown.

Now referring to FIG. 5, an underside view of a drive system 500 with the cutterbar 402 and discs 404 removed is shown. In the embodiment of FIG. 5 the term "clockwise" and "counter clockwise" is used based on the perspective shown in FIG. 5 and is not limiting. In the embodiment shown in FIG. 5, a disc gear 502 may be mechanically coupled to each of the respective underlying discs 404. Further, the disc gears 502 may be in direct contact with one another to provide one mechanical linkage along the cutterbar 402. That is to say, rotating one disc gear 502 will rotate all of the disc gears 502 coupled to the cutterbar 402. While disc gears 502 are described in detail herein, this disclosure should not be limited to using gears. Rather, belts, pulleys, sprockets, chains, and any other mechanical linkage that can transfer a torsional load are considered herein.

The direct linkage between the disc gears 502 will also provide for an alternating rotational pattern as is known in the art. In this configuration, a drive gear 504 may provide drive power to any one of the disc gears 502. The particular disc gear 502 that the drive gear 504 engages may dictate the rotation of each of the remaining disc gears 502, and in turn each of the discs 404. In one example, the drive gear 504 may rotate in a counter clockwise manner. The drive gear 504 may engaged the disc gear 502 closest to the mower arm 212 to rotate the first disc gear 502 in a clockwise direction as shown in the first position 406 in FIG. 5. In this configuration, each disc 404 may rotate in the directions indicated by the rotation arrows 422 of FIG. 4.

However, as described in more detail above, the mower head 214 may rotate to any position between the first position 406 and the fifth position 414. While the first position 406 and the fifth position 414 have been described as about 180 degrees from one another, the mower head 214 may become disposed at any angular orientation there between. Additionally, if the discs 404 continued to rotate in the direction shown by the rotation arrows 422 when the mower head 214 is in the fifth position 414, the portions of the discs 404 proximate to the second side 418 now face the front 106 and will be force the debris in an opposite direction than desired. Accordingly, the directions that each of the discs 404 rotate (i.e. the rotation pattern) may be altered as the mower head 214 is transitioned from the first position 406 to the fifth position 414.

In one embodiment, the drive gear 504 may alternate the rotation pattern of the discs by selectively engaging a different disc gear 502 based on the orientation of the mower arm 212 relative to the sub-frame 206. In this embodiment, as the mower head 214 is rotated from the first position 406 to the fifth position 414, the drive gear 504 may become disengaged from the first disc gear 506 and become engaged to a second disc gear 508, thus altering the rotation pattern of the drive system 500.

FIG. 5 illustrates a step-by-step application of this embodiment. More specifically, in the first position 406, the drive gear 504 may be engaged to the first disc gear 506. As the mower arm 212 rotates the mower head 214 to the second position 408, the drive gear 504 begins to become spaced from the first disc gear 506. When the mower atm 212 is rotated to be disposed in the third position 410, which may be substantially midway between the first position 406 and the fifth position 414, the drive gear 504 may be substantially disengaged from both the first disc gear 506 and the second disc gear 508. In one aspect of this embodiment, a braking mechanism (not shown) can be activated during the third position 410 to substantially stop the drive system 500 from rotating. As the mower arm 212 becomes oriented in the fourth position 412, the braking mechanism may release and the drive gear 504 may become positioned closer to the second disc gear 508. Finally, as the mower head 214 becomes disposed in the fifth position 414, the drive gear 504 may engage the second disc gear 508 to rotate the remaining disc gears 502, and in turn the discs 404, in substantially the opposite direction or rotation pattern as the discs 404 rotated in the first position 406.

In the above embodiment, the drive gear 504 could be linked to a cam slider (not shown) that positions the drive gear 504 to engage the correct disc gear 502 depending on the position of the mower arm 212. In this embodiment, the cam slider may be coupled to a linkage (not shown) that is further coupled to a drive gear support (not shown). Further, the cam slider may have a cammed surface that interacts with a portion of the sub-frame 206 as the mower arm 212 transitions between the various positions 406, 408, 410, 412, 414. When the mower head 214 is in the first position 406, the cam slider may position the linkage and drive gear support in a position that allows the drive gear 504 to engage the first disc gear 506. Alternatively, when the mower head 214 is in the fifth position 414, the cam slider may position the linkage and drive gear support in a position that allows the drive gear 504 to engage the second disc gear 508.

In another embodiment, the drive gear 504 may be mounted to only engage one of the disc gears 502. In this embodiment, the drive gear 504 may not change positions as the mower head 214 transitions between the various positions 406, 408, 410, 412, 414. Rather, in this embodiment, the drive assembly 208 may alter the rotation of the output 320 that in turn may rotate the drive gear 504 in alternative directions.

In the embodiment where the drive assembly 208 utilizes a planetary gearset and clutches, the clutches may be engaged or disengaged in a first configuration to provide a clockwise output when the mower head 214 is in the first position 406. Alternatively, the clutches may be engaged or disengaged in a second configuration to provide a counter clockwise output when the mower head 214 is in the fifth position 414.

In the embodiment where the drive assembly 208 is a hydraulic pump, the hydraulic motor can be mechanically coupled to the drive gear 504 to provide torque that is ultimately transferred to the discs 404. In this embodiment, a plurality of valves may control the rotational direction of the hydraulic motor to change the rotational direction of the drive gear 504 between a clockwise rotation and a counter clockwise rotation.

In another embodiment utilizing the hydraulic system, each disc 404 may have a separate hydraulic motor hydraulically coupled thereto. Each hydraulic motor may be configured to rotate in an opposite direction of the subsequent motor and the hydraulic pump may provide hydraulic pressure in one of two supply routes. In the first supply route the first hydraulic motor may rotate in a clockwise direction with the remaining motors alternating rotation directions. In the second supply rout the first hydraulic motor may rotate in a counter clockwise direction with the remaining motors alternating rotation directions. In this embodiment, the hydraulic pump may be routed through the first supply route when the mower head 214 is in the first position 406 and the hydraulic pump may be routed through the second supply route when the mower head 214 is in the fifth position 414.

In the embodiment where the drive assembly 208 is an electric motor there may be no drive assembly 208 coupled to the sub-frame 206 at all. Rather, one or more electric motors may be mechanically coupled to the discs 404. In one embodiment, a single electric motor may be coupled to the drive gear 504 to provide torsional power to the disc gears 502. In this embodiment the single electric motor can selectively rotate in either a clockwise or counter clockwise direction and rotate the disc gears 502 accordingly. In another embodiment, there may be an electric motor directly coupled to the discs 404 instead of utilizing the disc gears 502 and drive gear 504 described above. In this embodiment, each electric motor may selectively rotate the relative disc 404 as needed.

One embodiment of the mower assembly 202 may utilize a braking mechanism (not specifically shown) to slow and/or stop the rotation of the discs 404 as the mower head is moved to the various positions 406, 408, 410, 412, 414. In one embodiment, a rotor may be coupled to one or each of the discs 404. The rotor may have a corresponding calliper coupled to the mower head 214 that can selectively engage the rotor to slow the rotation of the discs 404. In the embodiment utilizing the hydraulic or electric motors, the output direction may be impulsively altered to provide a stopping force instead of using the brake and rotor described above.

In any of the embodiments shown and described above, a controller (not shown) may communicate with a plurality of sensors (not shown) to control the electric motor(s), hydraulic valve(s), braking mechanism(s), and/or clutch(es). More specifically, in one embodiment, the engagement/disengagement of the clutches can be controlled through a controller (not shown) and a plurality of sensors. The plurality of sensors may send a signal to the controller indicating the position of the mower arm 212. After the controller identifies the position of the mower arm 212, the controller can engage/disengage the clutches and/or brake to control the rotation of the discs 404 as needed.

In another embodiment, the controller may similarly monitor the sensors to drive the one or more electric motors depending on the position of the mower arm 212. In yet another embodiment, the hydraulic pump and/or hydraulic motor or valves can similarly be controlled by the controller based on the inputs from the plurality of sensors.

Figure 6:
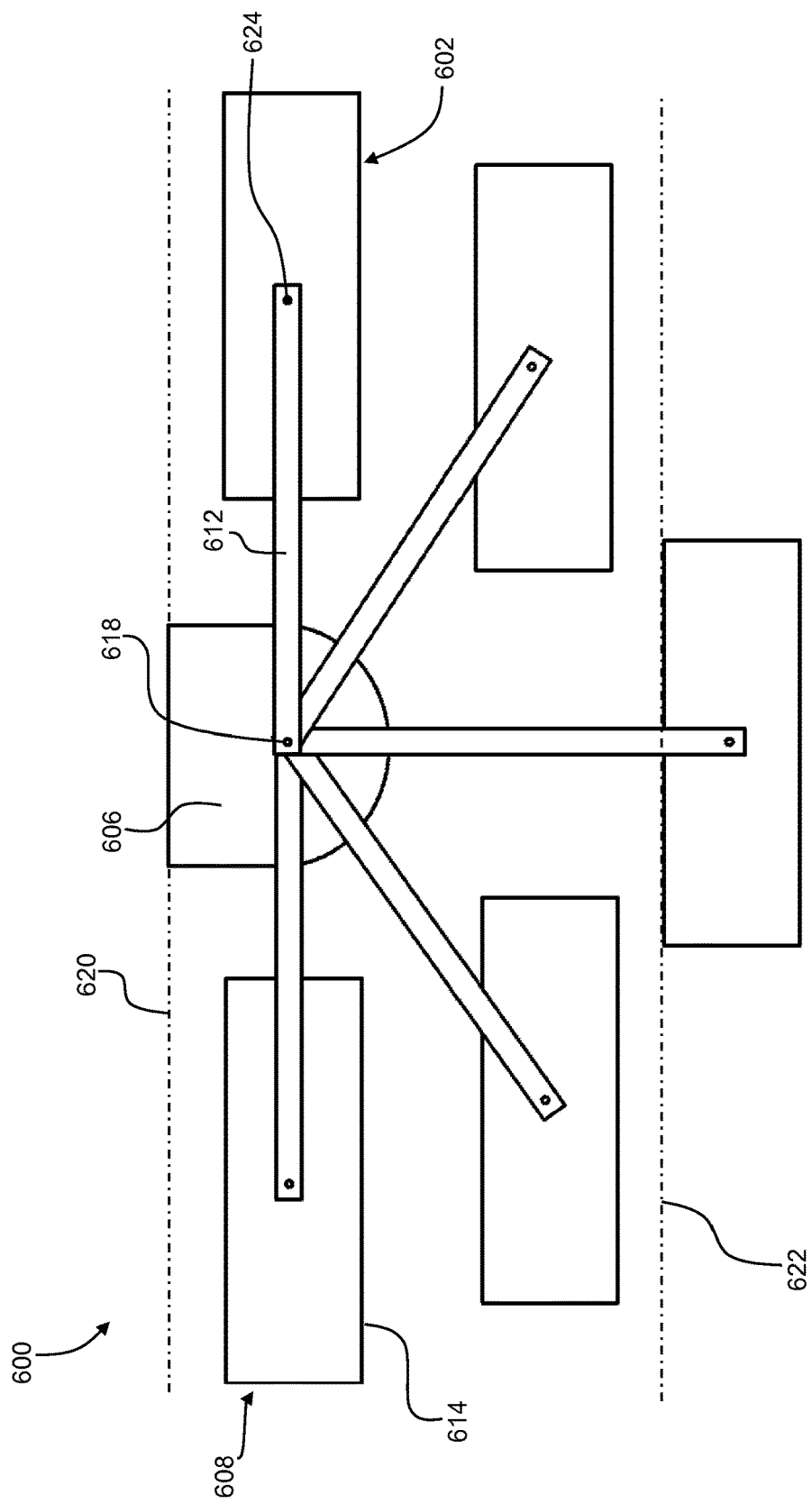
FIG. 6 is a top view of a middle-pivot embodiment of the present disclosure.

Referring now to FIG. 6, a pivoting mower head assembly 600 is shown transitioning a mower head 614 from a first position 602 to a second position 608. This embodiment may be substantially similar to the embodiment shown in FIG. 4 having a pivot pin 618 that couples a mower arm 612 to a sub-frame 606. Further, the mower arm 612 may be rotated relative to the sub-frame 606 utilizing a hydraulic cylinder or actuator (not shown in FIG. 6) in a similar way as described in more detail above.

The embodiment shown in FIG. 6 may differ from the previous embodiments because the mower head 614 may not rotate substantially relative to the sub-frame 606 as the mower head 614 is rotated between the first position 602 and the second position 608. More specifically, a first axis 620 may be defined by a front portion of the sub-frame 606 and a second axis 622 may be defined by a front portion of the mower head 614. In this embodiment, the second axis 622 of the mower head 614 remains substantially parallel to the first axis 620 defined by the sub-frame 606 regardless of the position of the mower arm 612 relative to the sub-frame 606.

In the embodiment of FIG. 6, a linkage (not shown) may connect the pivot pin 618 to a mower pivot 624 to ensure the first and second axis 620, 622 remain substantially parallel to one another. In one embodiment, the pivot pin 618 may be fixedly coupled to the sub-frame 606 and have a first stationary sprocket fixedly coupled thereto. Additionally, the mower pivot 624 may be fixedly coupled to the mower head 614 but pivotally coupled to the mower arm 612. The mower pivot 624 may similarly have a second stationary sprocket fixedly coupled thereto. A mower chain may couple the first stationary sprocket of the sub-frame 606 to the second stationary sprocket of the mower pivot 624. In this embodiment, the angular orientation of the second axis 622 will remain substantially parallel to the first axis 620 because the first stationary sprocket will pivot the mower head 614 through the second stationary sprocket as the mower arm 612 is rotated between the first position 602 and the second position 608.

In the embodiment shown in FIG. 6, the drive assembly 208 may route the hydraulic, electrical, or mechanical system to the discs 404 through the mower pivot 624. More specifically, because the mower head 614 pivots relative to the mower arm 612, the hydraulic, electrical, or mechanical system may be routed along the mower arm 612 to a location proximate the mower pivot 624 to allow the mower head 614 to rotate without affecting the hydraulic, electrical, or mechanical system.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A mower assembly adapted to be coupled to a hitch of a work machine that has an output, the mower assembly comprising:
   a sub-frame having one or more hitch couplers, the sub-frame adapted to couple to the hitch of the work machine via the hitch couplers;
   a drive assembly coupled to the sub-frame, the drive assembly having an input coupler and a drive assembly output, the input coupler adapted to be driven by the output of the work machine;
   a mower arm pivotally coupled to the sub-frame at a primary pivot;
   a rotation member having a first end pivotally coupled to the mower arm and a second end pivotally coupled to the sub-frame, the rotation member being pivotable to change the angular orientation of the mower arm relative to the sub-frame;
   a mower head coupled to the mower arm, the mower head having a cutterbar assembly with a plurality of discs;
   a drive line coupling the drive assembly output to the cutterbar assembly, the drive line selectively rotating the plurality of discs;
   a drive gear coupled to the drive assembly output; and
   a plurality of gears coupled to each of the plurality of discs, each of the plurality of gears engaging the adjacent gear of the plurality of discs;
   wherein, the mower arm rotates the mower head about the primary pivot greater than 90 degrees from a first side of the work machine to a second side of the work machine;
   further wherein, when the mower head is on the first side of the work machine the plurality of discs rotate in a first rotation pattern, and when the mower head is on the second side of the machine the plurality of discs rotate in a second rotation pattern, the first rotation pattern having at least one different rotation direction than the second rotation pattern;
   further wherein, the drive gear selectively engages one of the plurality of gears for achieving the first rotation pattern, and selectively engages an adjacent gear for achieving the second rotation pattern.

2. The mower assembly of claim 1, further wherein the drive line comprises at least one drive chain mechanically coupling the output of the drive assembly to the cutterbar assembly via at least one sprocket.

3. The mower assembly of claim 2, further wherein the drive chain is mechanically coupled to at least one of the plurality of gears through the drive gear.

4. The mower assembly of claim 1, further comprising at least one hydraulic motor fluidly coupled to a hydraulic pump and mechanically coupled to the cutterbar assembly with the drive gear, the hydraulic motor operably rotating the plurality of discs.

5. The mower assembly of claim 1, further comprising a brake for selectively inhibiting the rotation of the plurality of discs as the mower head pivots between the first side and the second side of the machine.

6. The mower assembly of claim 1, wherein the rotation member comprises a hydraulic cylinder having a base end and a far end, where the base end is pivotally coupled to the sub-frame and the far end is pivotally coupled to the mower arm;
   further wherein, the far end of the hydraulic cylinder is axially movable relative to the base end thereof;
   further wherein, the mower arm is positionable relative to the sub-frame based on the axial movement of the far end relative to the base end of the hydraulic cylinder.

\* \* \* \* \*